ly understood by referring to the following examples:

3,221,338
METHOD OF PREPARING FREE-FLOWING DRY FLOUR AND OTHER PARTICLES
Sidney Segal, P.O. Box 1964, Wilmington, Del.
No Drawing. Filed Feb. 17, 1961, Ser. No. 94,109
11 Claims. (Cl. 99—93)

The present application is a continuation-in-part of copending application Serial #57,380, filed September 21, 1960, now abandoned.

My invention relates to the art of preparing solids in anti-setting and anti-caking form, freely dispersible in liquids without clumping during dispersion.

Many solids, including organic as well as inorganic materials tend to set or cake between manufacture and use, or tend to clump or resist dispersion in liquids. The problem is particularly acute with finely divided solids.

An object of this invention is the elimination or alleviation of setting, caking, and subsequent clumping during dispersion in liquids. Other objects will be appreciated from the following detailed description of my invention.

My invention involves treating a normally caking, setting, or clumping solid to lessen said characteristics and comprises contacting the powdered solid with a controlled quantity of liquid in which it is soluble, followed by drying, preferably with agitation, with or without heat. The dissolving liquid is used in amounts substantially less than that necessary to bring the entire mass into solution, since the object is merely to treat the surface and edges of the particles. For instance, a solvent already containing dissolved material (the same as the treated material, or different as desired), may be used.

Likewise the solvent liquid may be dispersed in a non-solvent liquid as a carrier. In fact, this embodiment is greatly preferred since it permits highly accurate control of the extent to which the particles are exposed to the dissolving liquid.

A comparison of the treated solid with untreated material shows rounding of sharp edges or crystal corners of the particles as a result of the treatment. Frequently, minutely fine particles are found to be attached to the surface of the rounded larger particles. Alternatively, with some materials, the particle surface seems generally emaciated and eroded. Any and all of these characteristics result in a solid of improved anti-setting and anti-clumping properties.

Any aqueous or non-aqueous liquids may be used. If more than one liquid is used it is preferred that they be miscible, and the solid may be incorporated in the two liquids already mixed, or in the one liquid and the others added.

The invention may be applied to any solvent soluble solid having setting or clumping qualities or properties. Outstanding examples of powders normally subject to clumping are the gums, whether natural such as guar, arabic, agar, karaya, tragacanth, psyllium, locust bean, and others, or synthetic gums such as the hemi-celluloses, for instance sodium carboxymethyl cellulose, hydroxyethyl cellulose, methyl cellulose, ethylhydroxyethyl cellulose, hydroxypropylmethyl cellulose and the like; the starchy gums such as dextrins, hydroxyethyl starch and other hydroxyalkyl starches and the like; resins, dyestuffs, esters, organic acids, alcohols (including polyvinyl alcohol), flours, starches and sugars.

Outstanding examples of materials normally subject to setting or caking are cement, the various salts such as ammonium nitrate and other nitrates, phosphates, fertilizers generally, urea, catalyst materials, nitrites, chlorides and other halides.

The invention may be more readily understood by referring to the following examples:

Example 1

A system was prepared containing 50 gms. of sodium CMC, 500 cc. of aceton, and 50 cc. of water. The liquids were combined first and the CMC added. After thorough agitation, the liquid was poured off and the CMC was air dried with heat. The resulting CMC was readily dispersible in water.

Example 2

A system was prepared containing 10 gms. of powdered guar gum, 200 cc. of acetone and 5 cc. of water. The liquids were combined first, and the guar gum added. After agitation, the liquid was removed and the guar gum was air dried. The resulting guar gum was readily dispersible in water.

Example 3

A system was prepared containing 100 gms. of polyvinyl alcohol, 1000 cc. of hot acetone and 50 cc. of hot water. The liquids were combined first, in a closed container to prevent evaporation, and the PVA added. The liquid was poured off and the PVA was air dried with heat. The resulting PVA was readily dispersible in hot water.

Example 4

A system was prepared containing 100 gms. of methyl cellulose, 1000 cc. of acetone, and 50 cc. of water. The liquids were combined in a container and the methyl cellulose added. The liquid was extracted and the methyl cellulose was air dried with heat. The resulting methyl cellulose was readily dispersible in cold water.

Example 5

A system was prepared containing 250 gms. of flour, 2000 cc. of hot acetone and 50 cc. of hot water. The liquids were combined first, in a closed container to prevent evaporation, and the flour added with agitation. The liquid was removed and the flour was air dried with heat. The resulting flour was readily dispersible in hot water.

Example 6

A system was prepared containing 100 gms. of nitrocellulose, 3000 cc. of water and 25 cc. of acetone. The liquids were combined first and the nitrocellulose was added with agitation. The liquid was then extracted and the nitrocellulose was air dried. The resulting particulate nitrocellulose was readily dispersible in acetone.

Example 7

1000 gms. of urea were thoroughly mixed and tumbled with 100 cc. of water and subsequently air dried with heat. The resulting urea was free flowing, clump resistant and most easily dispersed in water.

Example 8

1000 gms. of urea were thoroughly mixed with 1000 cc. of a saturated solution of urea. Tthe liquid was then removed and the urea air dried with heat. The resulting urea was particulate, free flowing and was easily dispersed in water.

Example 9

A system was prepared consisting of 1000 gms. of urea, 1500 cc. of acetone, and 50 cc. of water. The liquids were combined in a container and then the urea was added and thoroughly agitated. The liquid was drawn off and the urea was then dried in air with heat. The urea remaining was a free flowing particulate material, very easily dispersible in water. The particles of this new product no longer had the typical sharp corners and edges of urea, but rather consisted of rounded larger particles with, in some instances, smaller rounded particles adhering thereto.

*Example 10*

1500 gms. of ammonium nitrate were intimately mixed into a liquid system consisting of 2000 cc. of acetone and 100 cc. of water. The liquid system was then removed and the solid dried with tumbling in air. The resulting ammonium nitrate product was free flowing and non-clumping.

*Example 11*

2000 gms. of borax were intimately mixed into a mixture of 2000 cc. of acetone and 150 cc. of water. After the liquid portion of the system was removed, the remaining borax was air dried with heat. The borax product resulting from this treatment was particulate and free flowing and resisted further clumping.

It will be noted that the invention is applied preferably to those solids in finely divided condition and at temperatures at which solution normally occurs. For instance, polyvinyl alcohol is normally soluble in hot water, so that the invention is applied with heat and the treated product subsequently dispersed in hot water. Numerous variations can be made with respect to the foregoing without departing from the scope or spirit of my invention.

I claim:

1. The method of converting solvent soluble solid particles which normally tend to cake in storage and clump in a solvent dispersing medium to free-flowing dry particles instantly dispersible in solvents, comprising homogeneously wetting the surfaces of said solid particles with a mixture consisting essentially of a volatile liquid solvent for said particles and a volatile liquid non-solvent for said particles, miscible with said solvent, the total solvent component of the liquid mixture with which said solids are wet being less than sufficient to dissolve said solid particles, and then drying said wetted solids to remove all of the wetting liquid.

2. The method of claim 1 wherein the solid particles are a flour.

3. The method of claim 1 wherein the solid particles are a sugar.

4. The method of claim 1 wherein the solid particles are a cellulose ester.

5. The method of claim 1 wherein the solid particles are a cellulose ether.

6. The method of claim 1 wherein the solid particles are a gum.

7. The method of claim 1 wherein the solid particles are a water soluble inorganic salt.

8. The method of claim 1 wherein the solid particles are a dyestuff.

9. The method of claim 1 wherein the solid particles are urea.

10. The method of claim 1 wherein the solid particles are an organic acid.

11. The method of claim 1 wherein the solid particles are a resin.

References Cited by the Examiner

UNITED STATES PATENTS

| | | | |
|---|---|---|---|
| 1,155,977 | 10/1915 | Vernon | 99—93 |
| 2,221,175 | 11/1940 | Bechtold | 23—313 X |
| 2,280,895 | 4/1942 | Datin | 23—313 |
| 2,307,253 | 1/1943 | Yee et al. | 117—106 |
| 2,356,282 | 8/1944 | Stamatoff | 260—90 |
| 2,394,244 | 2/1946 | Koktnur | 23—91 |
| 2,402,192 | 6/1946 | Williams et al. | 23—103 |
| 2,433,611 | 12/1947 | Ingels | 99—232 |
| 2,535,313 | 12/1950 | Mitchell | 99—232 |
| 2,556,727 | 6/1951 | Lane et al. | 260—314.5 |
| 2,618,633 | 11/1952 | Vaughan | 260—233.3 X |
| 2,814,618 | 11/1957 | Sloan | 260—232 |
| 2,835,606 | 5/1958 | Ladd | 117—6 |
| 2,888,713 | 6/1959 | Cook et al. | 71—64 |
| 2,933,377 | 4/1960 | Doubt et al. | 23—313 |
| 2,970,063 | 1/1961 | Jordan et al. | 260—209.5 X |

FOREIGN PATENTS

| | | |
|---|---|---|
| 578,624 | 7/1946 | Great Britain. |

A. LOUIS MONACELL, *Primary Examiner.*

JOSEPH B. SPENCER, WILLIAM D. MARTIN, RAYMOND N. JONES, *Examiners.*